US012045267B2

(12) United States Patent
Saraf et al.

(10) Patent No.: US 12,045,267 B2
(45) Date of Patent: Jul. 23, 2024

(54) ENTITY ENGINE OF A COMPUTING PLATFORM

(71) Applicant: UiPath, Inc., New York, NY (US)

(72) Inventors: Ankit Saraf, Bellevue, WA (US); Mircea Grigore, Bucharest (RO); Palak Kadakia, Bellevue, WA (US)

(73) Assignee: UiPath, Inc., New York, NY (US)

( * ) Notice: Subject to any disclaimer, the term of this patent is extended or adjusted under 35 U.S.C. 154(b) by 0 days.

(21) Appl. No.: 18/320,613

(22) Filed: May 19, 2023

(65) Prior Publication Data

US 2023/0289371 A1 Sep. 14, 2023

Related U.S. Application Data

(63) Continuation of application No. 17/959,720, filed on Oct. 4, 2022, now Pat. No. 11,693,891, which is a continuation of application No. 16/986,767, filed on Aug. 6, 2020, now Pat. No. 11,461,374.

(51) Int. Cl.
*G06F 16/28* (2019.01)
*H04L 9/40* (2022.01)

(52) U.S. Cl.
CPC .......... *G06F 16/288* (2019.01); *G06F 16/285* (2019.01); *H04L 63/0853* (2013.01)

(58) Field of Classification Search
None
See application file for complete search history.

(56) References Cited

U.S. PATENT DOCUMENTS

| 6,708,166 | B1 | 3/2004 | Dysart et al. |
| 6,738,077 | B1 | 5/2004 | Wendker et al. |
| 9,195,709 | B2 | 11/2015 | Baranov et al. |
| 2004/0078434 | A1 | 4/2004 | Parker et al. |
| 2008/0312997 | A1 | 12/2008 | van Wyk et al. |
| 2009/0064342 | A1 | 3/2009 | Chan et al. |
| 2009/0106242 | A1 | 4/2009 | McGrew et al. |
| 2014/0122872 | A1 | 5/2014 | Merrien et al. |

(Continued)

FOREIGN PATENT DOCUMENTS

KR 1020140051335 A 4/2014

OTHER PUBLICATIONS

Extended European Search Report for Application No. 21801409.0 dated Jun. 17, 2023.

*Primary Examiner* — Cai Y Chen
(74) *Attorney, Agent, or Firm* — Volpe Koenig

(57) ABSTRACT

A computing device including a memory and a processor is provided. The memory stores processor executable instructions for an entity engine. The processor is coupled to the memory. The processor executes the entity engine to cause the computing device to model entities, which hold or classify data. The processor executes the entity engine to cause the computing device to store in the memory a list identifying each of the entities and the entities themselves in correspondence with the list. The processor executes the entity engine to cause the computing device to provide, in response to a selection input from an external system, access to the entities based on the list. The access includes providing the list to the external system, receiving the selection input identifying a first entity of the entities, and exporting the first entity from the memory to the external system.

20 Claims, 8 Drawing Sheets

(56) References Cited

U.S. PATENT DOCUMENTS

| | | | |
|---|---|---|---|
| 2015/0242619 A1* | 8/2015 | Bender | H04L 63/10 |
| | | | 726/22 |
| 2017/0323107 A1 | 11/2017 | Bender et al. | |
| 2019/0318102 A1 | 10/2019 | Araya et al. | |
| 2020/0125590 A1* | 4/2020 | Ferrentino | G06F 16/9538 |
| 2020/0134374 A1 | 4/2020 | Oros | |
| 2021/0117571 A1* | 4/2021 | Prakash | G06F 16/906 |

\* cited by examiner

510

Create Entity Record

Entity Type
[ ]

Input Record
[ ]

Output Record
[ ]

520

Query Entity Records

Entity Type
[ ]

Query
[ ]

Output Records
[ ]

FIG. 5

611 → Entities ⟵ 601

| | |
|---|---|
| CustomerInvoice | 0 records |
|     CreatedBy | String |
|     CreateTime | DateTime |
|     Id | String |
|     UpdatedBy | String |
|     UpdateTime | DateTime |
| Customers | 0 records |
| Invoice | 3 records |
| Order | 2 records |
|     CreatedBy | String |
|     CreateTime | DateTime |
|     Id | String |
|     Name | String |
|     Product | String |
|     Quantity | String |
|     UpdatedBy | String |
|     UpdateTime | DateTime |
| Portfolio | 2 records |
| Product | 2 records |
|     CreatedBy | String |
|     CreateTime | DateTime |
|     DigitalAccess | Boolean |
|     Id | String |
|     IntroductionDate | DateTime |
|     Name | String |
|     UpdatedBy | String |
|     UpdatedTime | DateTime |
|     Weight | String |
| StockTracker | 0 records |

ENTITY ENGINE OF A COMPUTING PLATFORM

CROSS REFERENCE TO RELATED APPLICATIONS

This application is a continuation of U.S. patent application Ser. No. 17/959,720, filed Oct. 4, 2022, which is a continuation of U.S. patent application Ser. No. 16/986,767, filed Aug. 6, 2020, now U.S. Pat. No. 11,461,374, which are incorporated by reference as if fully set forth.

BACKGROUND

Conventional software products executing on a computing platform emulate and integrate common actions, such as data interactions within digital systems of the computing platform and/or software processes within the computing platform.

Yet, instead of the conventional software products or the computing platform itself, services external to the computing platform (e.g., third party databases) are used store and manage persistent business data with respect to these digital system interactions and any software process execution. Persistent business data includes information that is stored in non-volatile memory to survive beyond an initial use.

These external services can be cumbersome, with respect to how the external services interact with the computing platform (e.g., external services yield configuration and communication issues) and how the external services manage the data itself (e.g., data can be stored/organized differently than the computing platform). Further, storing persistent business data via external services decentralizes data storage operations from the conventional software products of the computing platform, which disjoints user experiences when using the computer platform.

SUMMARY

According to an embodiment, a computing device is provided. The computing device includes a memory and a processor. The memory stores processor executable instructions for an entity engine. The processor is coupled to the memory. The processor executes the entity engine to cause the computing device to model entities, which hold or classify data. The processor executes the entity engine to cause the computing device to store in the memory a list identifying each of the entities and the entities themselves in correspondence with the list. The processor executes the entity engine to cause the computing device to provide, in response to a selection input from an external system, access to the entities based on the list. The access includes providing the list to the external system, receiving the selection input identifying a first entity of the entities, and exporting the first entity from the memory to the external system.

According to one or more embodiments, the computing device embodiment above can be implemented as a method, an apparatus, a system, and/or a computer program product.

BRIEF DESCRIPTION OF THE DRAWING(S)

A more detailed understanding may be had from the following description, given by way of example in conjunction with the accompanying drawings, wherein like reference numerals in the figures indicate like elements, and wherein:

FIG. 5 is a diagram of a user interface according to one or more embodiments; and FIG. 6 is a diagram of a user interface according to one or more embodiments.

DETAILED DESCRIPTION

Figure 1A:
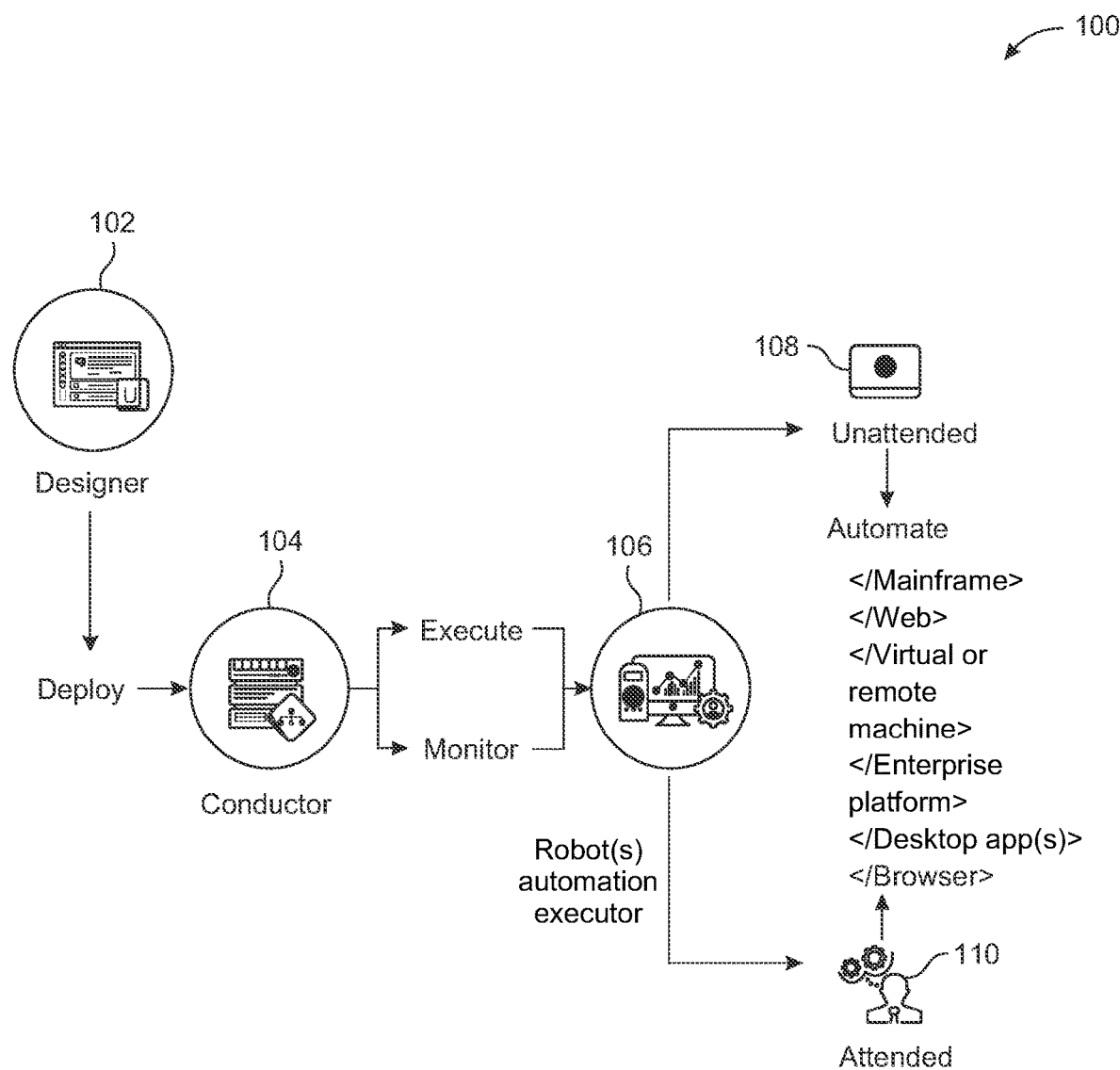
FIG. 1A is an illustration of robotic process automation (RPA) development, design, operation, or execution according to one or more embodiments.

Disclosed herein is an entity engine according to one or more embodiments. The entity engine is processor executable code or software that are necessarily rooted in process operations by, and in processing hardware of, a computing system or environment (e.g., the computing system or environment 140 of FIG. 1C) to provide a persistent data storage service that models and integrates entities that store and manage data (e.g., persistent customer related business data). Thus, according to one or more embodiments, the entity engine provides a specific configuring and tooling robotic process automation method for development and deployment platforms of the computing system or environment. This specific configuring and tooling robotic process automation method involves a multi-step manipulation of entities and data that these entities point to in connection with operating the development and deployment platforms (e.g., multi-step create/define/update/read/delete/query operations of the entities and the data).

An entity is a classified data unit that has stated relationships to other entities. The entity engine and operations thereof expand the capability of each entity to a custom class object or instance that both holds data and identified ways to manipulate the data. Examples of entities include program elements, procedures, operators, interface blocks, input-output units, symbolic constants, record structures, and statement labels, each of which can identify a person, a place, a thing, a concept, a physical object, and/or event about which data is stored with the entity. The entity engine uses entities to create a database and to manage and utilize the database during development runtime and/or deployment runtime (e.g., each entity being an active element that communicates with other entities).

In this regard and in operation, the entity engine models one or more entities. Each entity holds or classifies data, along with defines variables associated with the data, with respect to one or more properties/fields/columns therein. The entity engine stores (e.g., in a memory of the computing system or environment) a list. The list identifies each of the one or more entities. The entity engine also stores (e.g., in the memory) the one or more entities in correspondence with the list. The entity engine, in response to a selection input (e.g., from an external system), provides access to the one or more entities based on the list. In an example of providing access, the entity engine provides the list to the external system, receives the selection input identifying a first entity of the one or more entities, and exports the first entity from the memory to the external system. The entity engine can also authenticate and authorize the access as described herein.

The technical effects and benefits of the entity engine and entities therein include providing a persistent data storage service that enable users to generate, centralize, access, and use data seamlessly in the development and/or deployment platforms (e.g., thereby avoiding complications and deficiencies of external services). Further, due to the centralization and seamless access, the entity engine and entities themselves enable developers to build products and features around their data that otherwise are not available with external services. For example, external services generally require explicit credentials for access to any stored data and utilize representational state transfer (REST) queries that provide constraints for creating web services. In contrast, the entity engine integrates authentication and authorization operations at design/runtime so that developers can build products and features that do not need to provide or use the explicit credentials, while entities themselves enable activities (e.g., such as fetching and writing data) by the entity engine without the need to work with the REST queries and constraints thereof.

For the methods and processes described herein, the steps recited may be performed out of sequence in any order and sub-steps not explicitly described or shown may be performed. In addition, "coupled" or "operatively coupled" may mean that objects are linked but may have zero or more intermediate objects between the linked objects. Also, any combination of the disclosed features/elements may be used in one or more embodiments. When using referring to "A or B", it may include A, B, or A and B, which may be extended similarly to longer lists. When using the notation X/Y it may include X or Y. Alternatively, when using the notation X/Y it may include X and Y. X/Y notation may be extended similarly to longer lists with the same explained logic.

FIG. 1A is an illustration of robotic process automation (RPA) development, design, operation, or execution 100. Designer 102, sometimes referenced as a studio, development platform including one or more engines (e.g., an entity engine), development environment, or the like may be configured to generate code, instructions, commands, or the like for a robot to perform or automate one or more workflows. From a selection(s), which the computing system may provide to the robot, the robot may determine representative data of the area(s) of the visual display selected by a user or operator. As part of RPA, shapes such as squares, rectangles, circles, polygons, freeform, or the like in multiple dimensions may be utilized for UI robot development and runtime in relation to a computer vision (CV) operation or machine learning (ML) model.

Non-limiting examples of operations that may be accomplished by a workflow may be one or more of performing login, filling a form, information technology (IT) management, or the like. To run a workflow for UI automation, a robot may need to uniquely identify specific screen elements, such as buttons, checkboxes, text fields, labels, etc., regardless of application access or application development. Examples of application access may be local, virtual, remote, cloud, Citrix®, VMWare®, VNC®, Windows® remote desktop, virtual desktop infrastructure (VDI), or the like. Examples of application development may be win32, Java, Flash, hypertext markup language (HTML), HTML5, extensible markup language (XML), JavaScript, C #, C++, Silverlight, or the like.

A workflow may include, but are not limited to, task sequences, flowcharts, Finite State Machines (FSMs), global exception handlers, or the like. Task sequences may be linear processes for handling linear tasks between one or more applications or windows. Flowcharts may be configured to handle complex business logic, enabling integration of decisions and connection of activities in a more diverse manner through multiple branching logic operators. FSMs may be configured for large workflows. FSMs may use a finite number of states in their execution, which may be triggered by a condition, transition, activity, or the like. Global exception handlers may be configured to determine workflow behavior when encountering an execution error, for debugging processes, or the like.

A robot may be an application, applet, script, or the like, that may automate a UI transparent to an underlying operating system (OS) or hardware. At deployment, one or more robots may be managed, controlled, or the like by a conductor 104, sometimes referred to as an orchestrator. Conductor 104 may instruct or command robot(s) or automation executor 106 to execute or monitor a workflow in a mainframe, web, virtual machine, remote machine, virtual desktop, enterprise platform, desktop app(s), browser, or the like client, application, or program. Conductor 104 may act as a central or semi-central point to instruct or command a plurality of robots to automate a computing platform.

In certain configurations, conductor 104 may be configured for provisioning, deployment, configuration, queueing, monitoring, logging, and/or providing interconnectivity. Provisioning may include creating and maintenance of connections or communication between robot(s) or automation executor 106 and conductor 104. Deployment may include assuring the delivery of package versions to assigned robots for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 104 may provide interconnectivity by acting as the centralized point of communication for third-party solutions and/or applications.

Robot(s) or automation executor 106 may be configured as unattended 108 or attended 110. For unattended 108 operations, automation may be performed without third party inputs or control. For attended 110 operation, automation may be performed by receiving input, commands, instructions, guidance, or the like from a third-party component. Unattended 108 or attended 110 robots may run or execute on mobile computing or mobile device environments.

A robot(s) or automation executor 106 may be execution agents that run workflows built in designer 102. A commercial example of a robot(s) for UI or software automation is UiPath Robots™. In some embodiments, robot(s) or automation executor 106 may install the Microsoft Windows® Service Control Manager (SCM)-managed service by default. As a result, such robots can open interactive Windows® sessions under the local system account, and have the rights of a Windows® service.

In some embodiments, robot(s) or automation executor 106 may be installed in a user mode. These robots may have the same rights as the user under which a given robot is installed. This feature may also be available for High Density (HD) robots, which ensure full utilization of each machine at maximum performance such as in an HD environment.

In certain configurations, robot(s) or automation executor 106 may be split, distributed, or the like into several components, each being dedicated to a particular automation task or activity. Robot components may include SCM-managed robot services, user mode robot services, executors, agents, command line, or the like. SCM-managed robot services may manage or monitor Windows® sessions and act as a proxy between conductor 104 and the execution hosts (i.e., the computing systems on which robot(s) or automation executor 106 is executed). These services may be trusted with and manage the credentials for robot(s) or automation executor 106.

User mode robot services may manage and monitor Windows® sessions and act as a proxy between conductor 104 and the execution hosts. User mode robot services may be trusted with and manage the credentials for robots. A Windows® application may automatically be launched if the SCM-managed robot service is not installed.

Executors may run given jobs under a Windows® session (i.e., they may execute workflows). Executors may be aware of per-monitor dots per inch (DPI) settings. Agents may be Windows® Presentation Foundation (WPF) applications that display available jobs in the system tray window. Agents may be a client of the service. Agents may request to start or stop jobs and change settings. The command line may be a client of the service. The command line is a console application that can request to start jobs and waits for their output.

In configurations where components of robot(s) or automation executor 106 are split as explained above helps developers, support users, and computing systems more easily run, identify, and track execution by each component. Special behaviors may be configured per component this way, such as setting up different firewall rules for the executor and the service. An executor may be aware of DPI settings per monitor in some embodiments. As a result, workflows may be executed at any DPI, regardless of the configuration of the computing system on which they were created. Projects from designer 102 may also be independent of browser zoom level. For applications that are DPI-unaware or intentionally marked as unaware, DPI may be disabled in some embodiments.

Figure 1B:
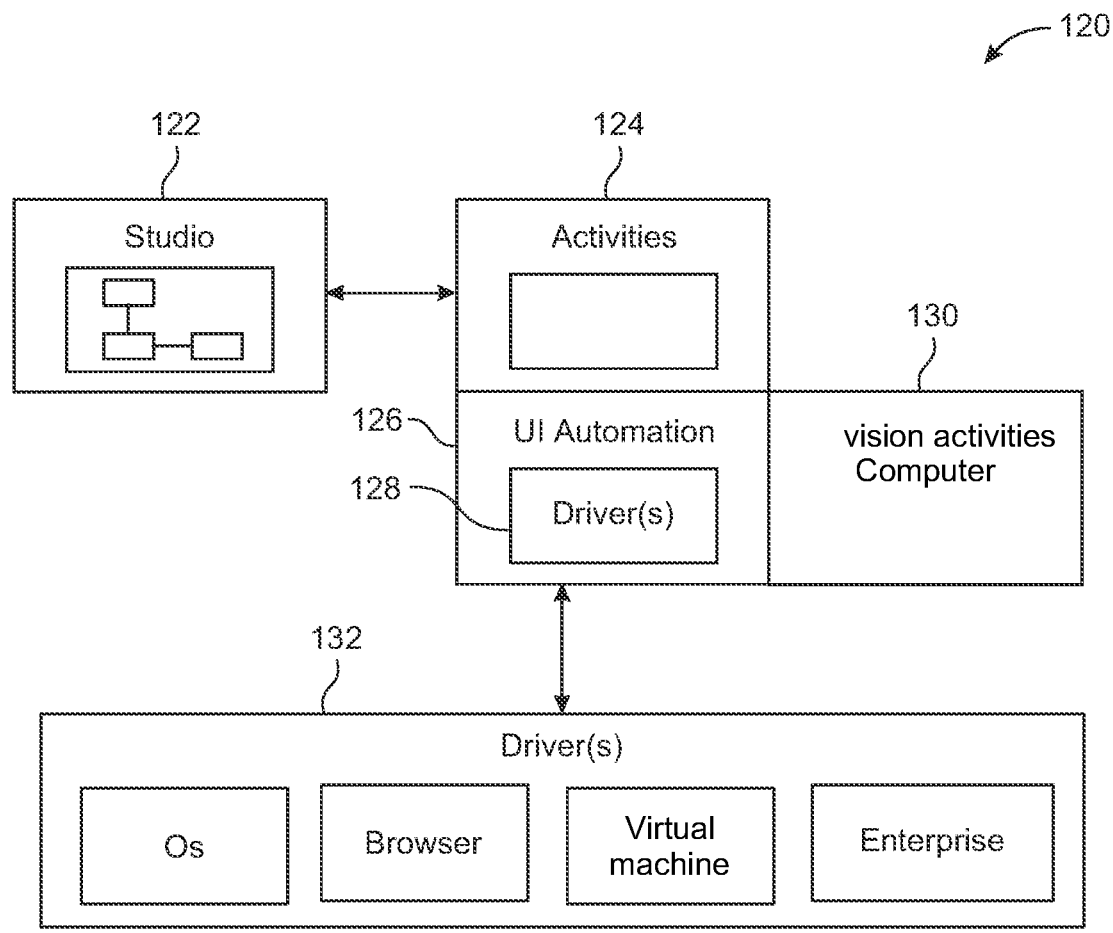
FIG. 1B is another illustration of RPA development, design, operation, or execution according to one or more embodiments.

FIG. 1B is another illustration of RPA development, design, operation, or execution 120. A studio component or module 122 may be configured to generate code, instructions, commands, or the like for a robot to perform one or more activities 124. User interface (UI) automation 126 may be performed by a robot on a client using one or more driver(s) components 128. A robot may perform activities using computer vision (CV) activities module or engine 130. Other drivers 132 may be utilized for UI automation by a robot to get elements of a UI. They may include OS drivers, browser drivers, virtual machine drivers, enterprise drivers, or the like. In certain configurations, CV activities module or engine 130 may be a driver used for UI automation.

Figure 1C:
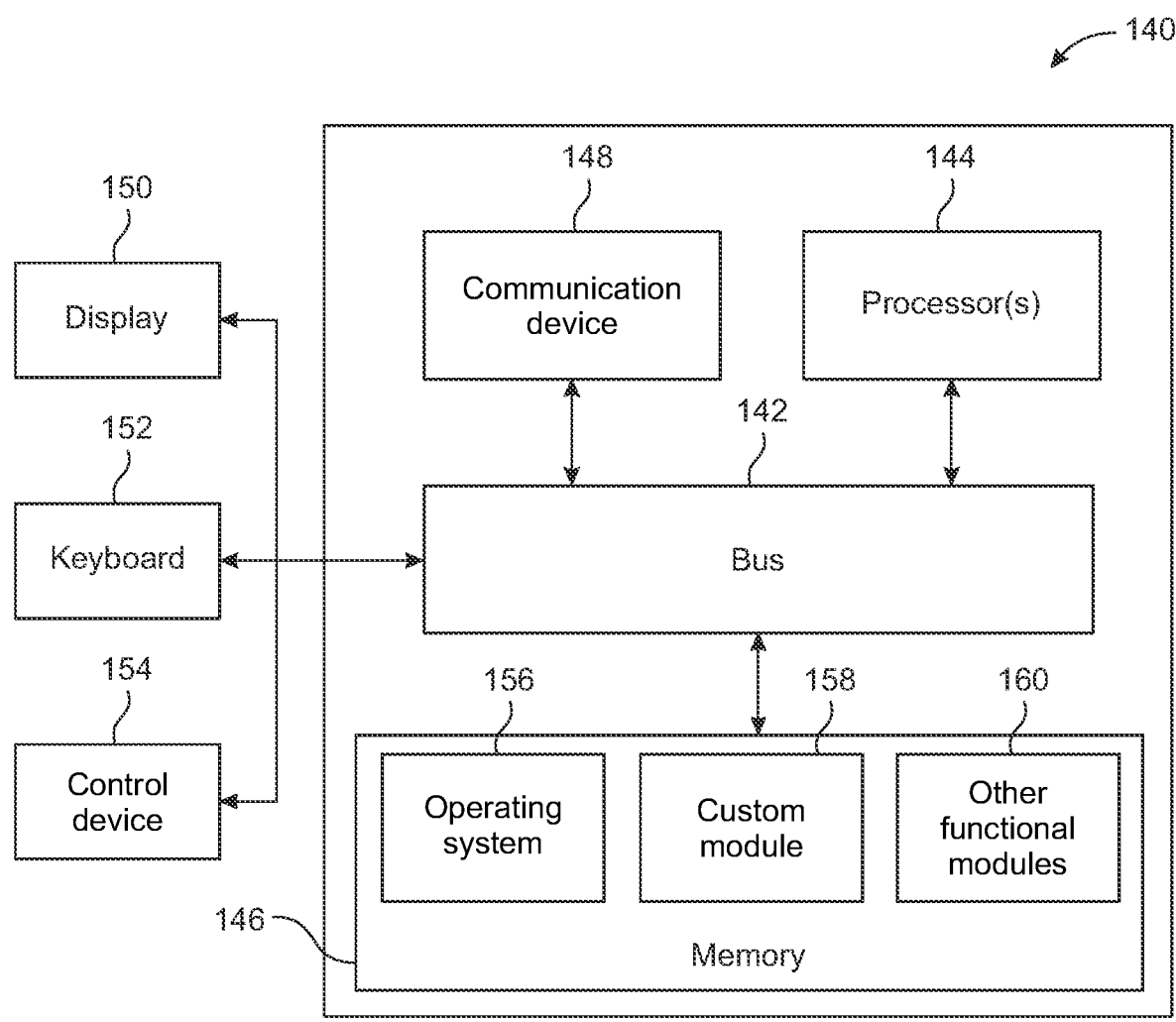
FIG. 1C is an illustration of a computing system or environment according to one or more embodiments.

FIG. 1C is an illustration of a computing system or environment 140 that may include a bus 142 or other communication mechanism for communicating information or data, and one or more processor(s) 144 coupled to bus 142 for processing. One or more processor(s) 144 may be any type of general or specific purpose processor, including a central processing unit (CPU), application specific integrated circuit (ASIC), field programmable gate array (FPGA), graphics processing unit (GPU), controller, multi-core processing unit, three-dimensional processor, quantum computing device, or any combination thereof. One or more processor(s) 144 may also have multiple processing cores, and at least some of the cores may be configured to perform specific functions. Multi-parallel processing may also be configured. In addition, at least one or more processor(s) 144 may be a neuromorphic circuit that includes processing elements that mimic biological neurons.

Memory 146 may be configured to store information, instructions, commands, or data to be executed or processed by processor(s) 144. Memory 146 can be comprised of any combination of random-access memory (RAM), read only memory (ROM), flash memory, solid-state memory, cache, static storage such as a magnetic or optical disk, or any other types of non-transitory computer-readable media or combinations thereof. Non-transitory computer-readable media may be any media that can be accessed by processor(s) 144 and may include volatile media, non-volatile media, or the like. The media may also be removable, non-removable, or the like.

Communication device 148, may be configured as a frequency division multiple access (FDMA), single carrier FDMA (SC-FDMA), time division multiple access (TDMA), code division multiple access (CDMA), orthogonal frequency-division multiplexing (OFDM), orthogonal frequency-division multiple access (OFDMA), Global System for Mobile (GSM) communications, general packet radio service (GPRS), universal mobile telecommunications system (UMTS), cdma2000, wideband CDMA (W-CDMA), high-speed downlink packet access (HSDPA), high-speed uplink packet access (HSUPA), high-speed packet access (HSPA), long term evolution (LTE), LTE Advanced (LTE-A), 802.11x, Wi-Fi, Zigbee, Ultra-WideBand (UWB), 802.16x, 802.15, home Node-B (HnB), Bluetooth, radio frequency identification (RFID), infrared data association (IrDA), near-field communications (NFC), fifth generation (5G), new radio (NR), or any other wireless or wired device/transceiver for communication via one or more antennas. Antennas may be singular, arrayed, phased, switched, beamforming, beamsteering, or the like.

One or more processor(s) 144 may be further coupled via bus 142 to a display device 150, such as a plasma, liquid crystal display (LCD), light emitting diode (LED), field emission display (FED), organic light emitting diode (OLED), flexible OLED, flexible substrate displays, a projection display, 4K display, high definition (HD) display, a Retina© display, in-plane switching (IPS) or the like based display. Display device 150 may be configured as a touch, three-dimensional (3D) touch, multi-input touch, or multi-touch display using resistive, capacitive, surface-acoustic wave (SAW) capacitive, infrared, optical imaging, dispersive signal technology, acoustic pulse recognition, frustrated total internal reflection, or the like as understood by one of ordinary skill in the art for input/output (I/O).

A keyboard 152 and a control device 154, such as a computer mouse, touchpad, or the like, may be further coupled to bus 142 for input to computing system or environment 140. In addition, input may be provided to computing system or environment 140 remotely via another computing system in communication therewith, or computing system or environment 140 may operate autonomously.

Memory 146 may store software components, modules, engines, or the like that provide functionality when executed or processed by one or more processor(s) 144. This may include an OS 156 for computing system or environment 140. Modules may further include a custom module 158 to perform application specific processes or derivatives thereof. Computing system or environment 140 may include one or more additional functional modules 160 that include additional functionality. For example, the entity engine can be implemented in one or more of the modules 158 and 160 to provide a specific configuring and tooling robotic process automation method to the computing system or environment 140.

Computing system or environment 140 may be adapted or configured to perform as a server, an embedded computing system, a personal computer, a console, a personal digital assistant (PDA), a cell phone, a tablet computing device, a quantum computing device, cloud computing device, a mobile device, a smartphone, a fixed mobile device, a smart display, a wearable computer, or the like.

In the examples given herein, modules may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may be at least partially implemented in software for execution by various types of processors. An identified unit of executable code may include one or more physical or logical blocks of computer instructions that may, for instance, be organized as an object, procedure, routine, subroutine, or function. Executables of an identified module co-located or stored in different locations such that, when joined logically together, comprise the module.

A module of executable code may be a single instruction, one or more data structures, one or more data sets, a plurality of instructions, or the like distributed over several different code segments, among different programs, across several memory devices, or the like. Operational or functional data may be identified and illustrated herein within modules, and may be embodied in a suitable form and organized within any suitable type of data structure.

In the examples given herein, a computer program may be configured in hardware, software, or a hybrid implementation. The computer program may be composed of modules that are in operative communication with one another, and to pass information or instructions.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Figure 2:
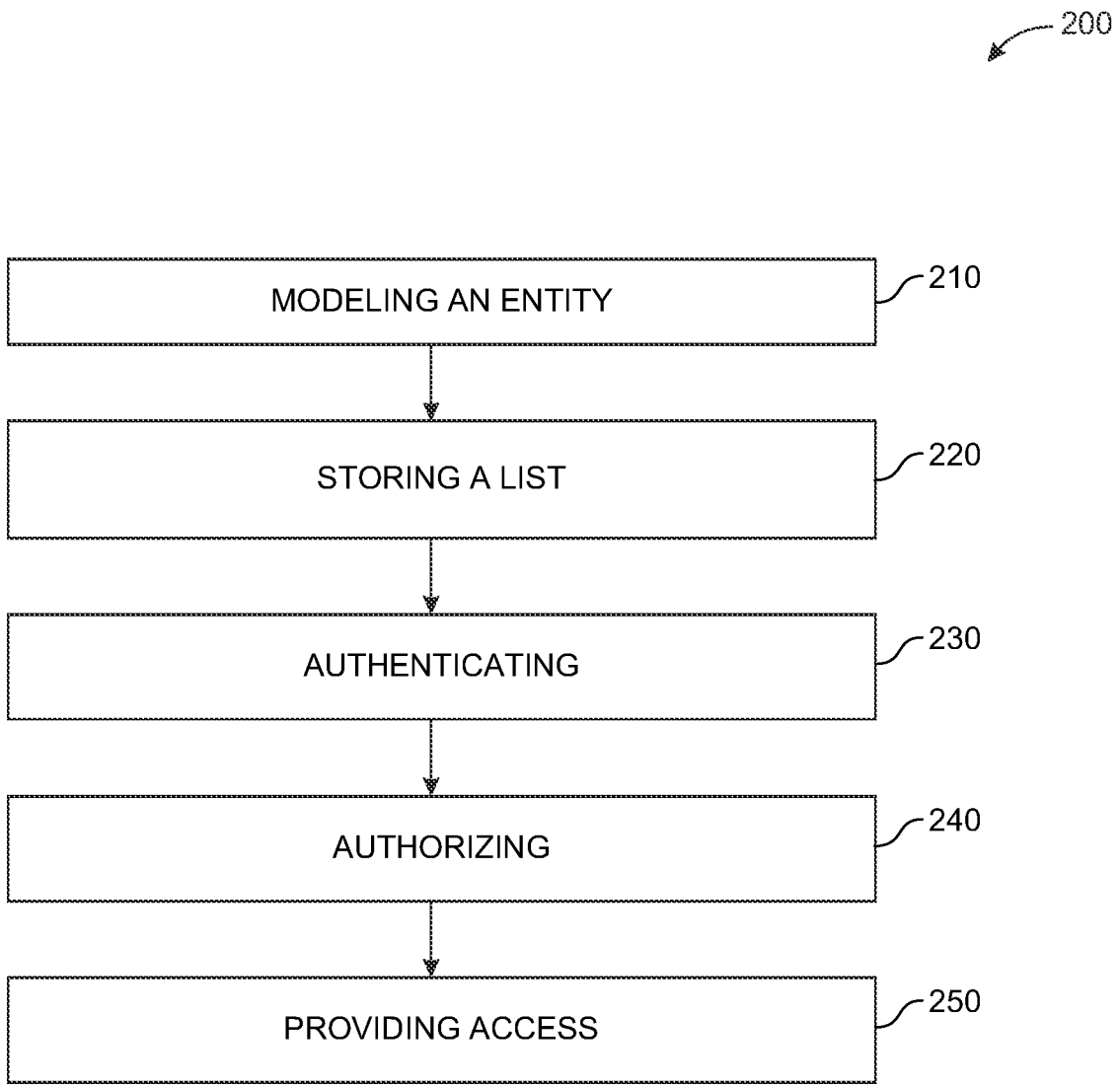
FIG. 2 is a block diagram illustrating a process flow executed by a computing system or environment according to one or more embodiments.

Turning now to FIG. 2, a block diagram illustrating a process flow 200 executed by a computing system or environment (e.g., the computing system or environment 140 of FIG. 1C) according to one or more embodiments. The process flow 200 is an example implementation of a method for operations by the entity engine executing in a development or deployment platform (e.g., the designer 104 and/or the conductor 106 of FIG. 1A).

In general, the process flow 200 provides a persistent data storage service (e.g., entities that are business user friendly) for the development or deployment platforms that can securely store and manage data (e.g., persistent customer related business data, such as records, documents, etc.). For example, the entity engine allows users within the context of development platforms to define/modify external business custom class objects or instances (e.g., entities) and store records for those entities, along with store documents associated with their records/entities. Subsequently, these entities are integrated into deployment platforms to allow the users to use these entities, reduce a number of needed variables/arguments per project, and provide consistent structure to the data for workflows. Thus, the process flow 200 includes a set of activities to create/define/update/read/delete/query entities and data therein, along with integrated authentication and authorization.

At block 210, the entity engine models one or more entities. Each entity can be configured to hold or classify data with respect to one or more properties/fields/columns therein. Each entity can be configured to define variables associated with the data. Each of the one or more entities can include a configurable structure (e.g., also referred to as an entity definition) that defines an entity type and/or links to other entities. In accordance with one or more embodiments, the entities are rich objects/classes that define variables and are available in a native programming model of development and/or deployment platforms. Examples of entities as rich objects/classes include, but are not limited to, ".NET" objects, ".NET", classes, Java classes, and JS classes. The data held or identified by the entities includes at least forms, documents, invoices, and/or records, along with any quantities, characters, symbols, and/or structures, on which computer operations are performed.

At block 220, the entity engine stores a list identifying each of the one or more entities. The list, in general, is representative of any data structure that contains/stores one or more identifiers corresponding to the one or more entities. The list can also contain/store one or more identifiers corresponding to one or more service instances accessible with respect to the one or more entities. In accordance with one or more embodiments, the list and the one or more entities can be stored in the same memory (e.g., the entity engine also stores the one or more entities in correspondence with the list). Note that the user or process can request the list from the entity engine. In accordance with one or more embodiments, the list can be implemented as an entity store. The entity store can be a digital distribution platform that allows users to browse, edit, and use listed entities. The entity store can store/itemize/point to one or more version of each entity, identify version dates, and indicate version availability.

At blocks 230 and 240, the entity engine authenticates and authorizes access to the one or more entities. Authentication by the entity engine includes an operation of proving something to be true, genuine, or valid, such as an identity of a user or process. In accordance with one or more embodiments, the entity engine can authenticate access to the one or more entities using token-based authentication operations. Token-based authentication operations include using a security token to authenticate the use or process attempting to access the entities. Authorization by the entity engine includes an operation of verifying what something (e.g., the user or the process) has access to.

In an example, a user can trigger a process that calls an entity. In this regard, the user may provide a selection input (with a security token) that identifies a first entity of the one or more entities itemized on the list. In another example, the selection input and/or the security token may be automatically provided (e.g., by the automation executor 106 or the designer 102 of FIG. 1A). Note that the user or process can request the list in advance of submitting the selection input. The user may be operating an external system. In turn, the list can be provided to the external system by the entity engine. The entity engine first authenticates the user, such as by validating the security token. Then, the entity engine authorizes the user, by determining that the user has permission to access the first entity. If both the authentication and the authorization are successful, the process flow 200 proceeds to block 250.

At block 250, the entity engine provides access to the one or more entities. This access can be in response to the selection input from the external system and based on the list. For instance, the access can include providing the list to the external system, receiving the selection input identifying the first entity, and exporting the first entity from the memory to the external system.

Figure 3:
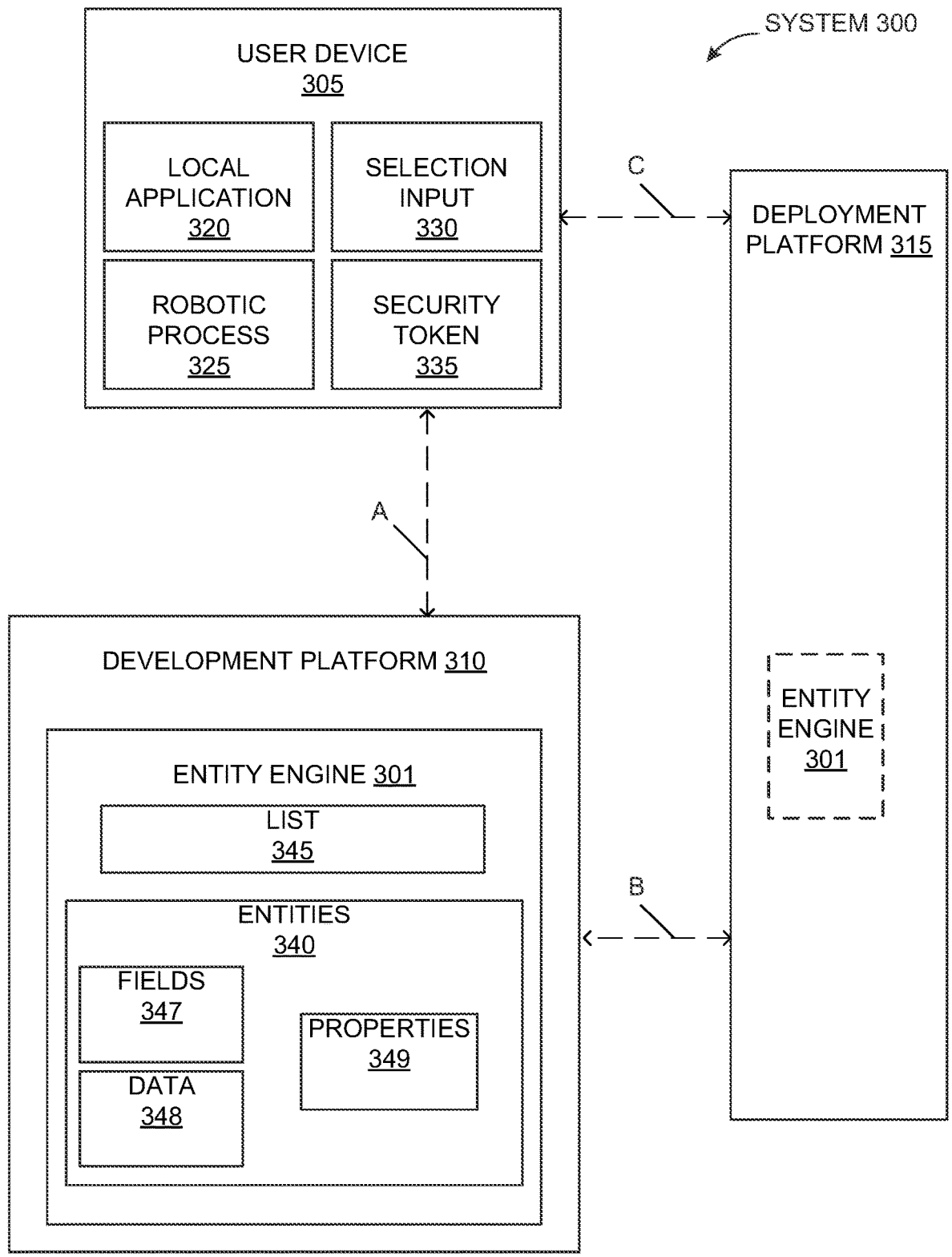
FIG. 3 is a block diagram illustrating a process flow executed by a computing system or environment according to one or more embodiments.

Turning now to FIG. 3, components and operations of an entity engine that provides a persistent data storage service are described according to one or more embodiments. Particularly, FIG. 3 is an illustration of a system 300 including one or more instances of an entity engine 301. In general, the operations of the entity engine 301 can include, but are not limited to, development/deployment data services; entity deployment integration; integration schema and activities, entity importation/exportation; imported/exported entity representation; and entity display. As shown in FIG. 3, the system 300 includes a user device 305, a development platform 310, and a deployment platform 315, each of which communicate (as shown by the dashed arrows A, B, and C) to provide and/or interact with instances of the entity engine 301 (e.g., note a first instance of the entity engine is shown in the development platform 310 and a second instance of the entity engine is shown in the deployment platform 315). Note that while instances of the entity engine 301 are shown as local to the development platform 310 and the deployment platform 315 (which can be collectively referred to herein as a platform), the entity engine 301 can also be local to the user device 305 or a stand-alone hardware/software combination that is in communication with the other components of the system 300. In this regard, each instance of the entity engine 301 may be the same or external versions thereof. Further, while a single block is shown for each item or component of the authentication system 300, that single block is representative of one or more of that item or component.

The user device 305 is representative of one or more user devices, each including at least a processor, a memory, and a display with a user interface. Examples of the user device 305 include, but are not limited to, a personal computer, a PDA, a cell phone, a tablet computing device, a mobile device, and a smartphone. The user device 305 can execute a local application 320 (e.g., a mobile application) and one or more robotic processes 325 that provides one or more screens on a display of the user device 305 (e.g., the user interface). The local application 320 (via a user through the user interface) or the robotic process 325 can generate and can communicate a selection input 330 with a security token 335.

The development platform 310 and/or deployment platform 315 is representative of one or more devices (e.g., a personal computer, a tablet computing device, a desktop device, etc.) for engaging the one or more robotic processes 325 and executing the entity engine 301 (either the first or second instance thereof), which comprises at least one entity 340 and at least one list 345. The list 345 identifies the at least one entity 340. The at least one entity 340 can include one or more fields 347 with respect to holding data 348 and/or properties 349. A property 349 associated with a field 347 can define a field type or type of information that the field 347 holds (e.g., a string, a Boolean value, etc.). A property can also be information stored in the field 347 itself. A combination of fields can produce one or more columns, rows, and/or tables.

In accordance with one or more embodiments, the development platform 310 and/or the online platform 315 is representative of one or more software-, infrastructure-, platform-based services that provide networks, servers, storage services, operating systems, database services, and security services to the user device 305 (e.g., one or more instances of the entity engine 330). For instance, the development platform 310 provides a creation environment used to build application software through graphical user interfaces and configuration, while the deployment platform 315 provides an execution environment in which the application software built in the development platform 310 is implemented. In accordance with one or more embodiments, the entity engine 301 (regardless of its location) can be integrated into one or more platforms to provide consistent structure and to allow users to use the at least one entity 340 with respect to workflows therein (e.g., a RPA/workflow through rich native programming model objects).

In an example operation, the local application 320 (via a user through the user interface) or the robotic process 325 can create/define/update/read/delete/query the entities 340 of the entity engine 301, while the entity engine 301 stores (e.g., in the memory of either the development platform 310 and/or the online platform 315) the one or more entities 340 in correspondence with the list 345. As noted herein, the entities 340 can be a custom class objects or instances that both hold the data 348 and ways to manipulate the data 348. Further, the entity engine 301 provides the list 345 to the local application 320 or the robotic process 325. Using the list 345, the local application 320 or the robotic process 325 can submit the selection input 330 with the security token 335 to either instance of the entity engine 301. In turn, the entity engine 301 receives the selection input 330 identifying a first entity of the one or more entities 340 and exports the first entity from the memory to the local application 320 or the robotic process 325.

Figure 4:
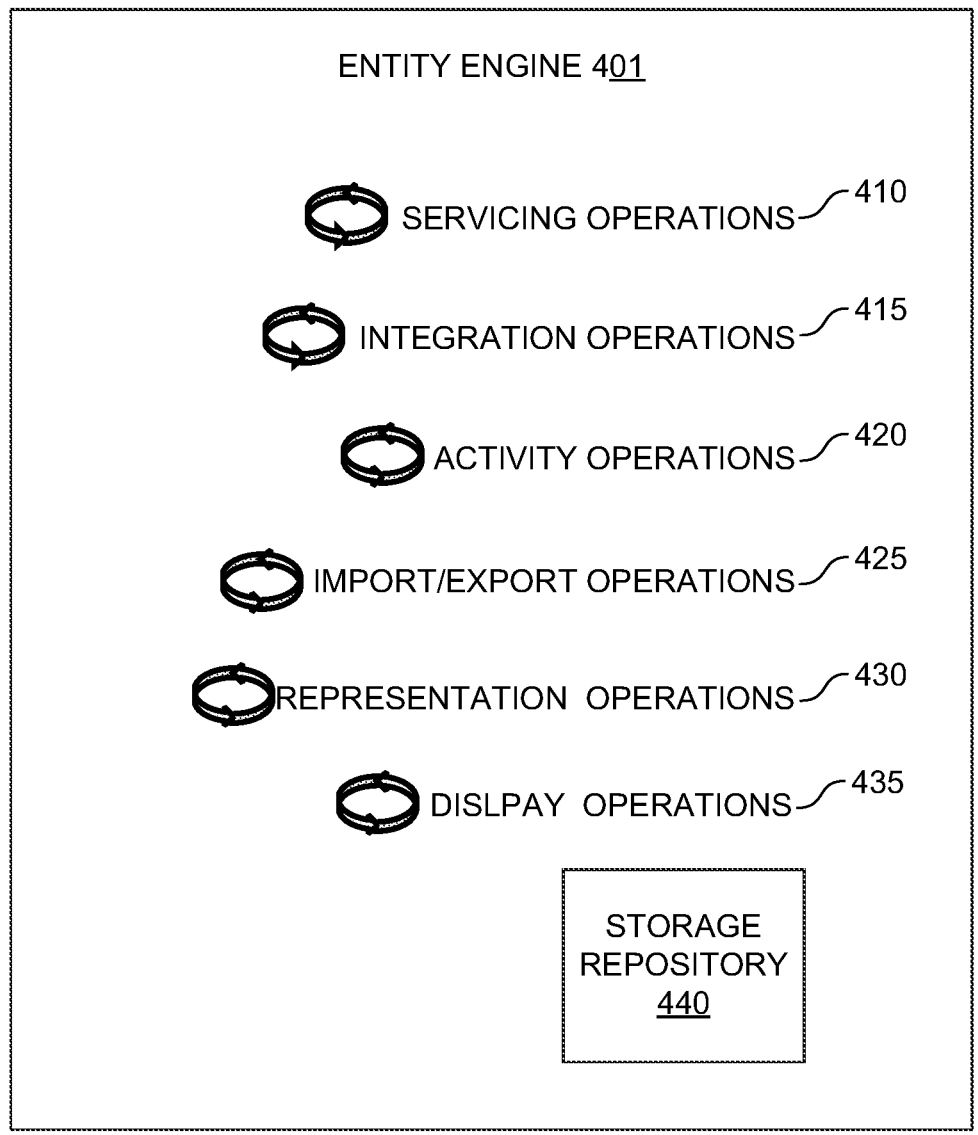
FIG. 4 is a diagram illustrating operations of an entity engine according to one or more embodiments.

Turning now to FIG. 4, operations of an entity engine 401 of FIG. 4 are described in view of user interfaces shown in FIGS. 5-7. Note that the entity engine 401 is processor executable code or software that are necessarily rooted in process operations by, and in processing hardware of, a computing system or environment (e.g., the computing system or environment 140 of FIG. 1C and/or the system 300 of FIG. 3) to provide a persistent data storage service that models and integrates entities that store and manage data (e.g., persistent customer related business data). Thus, according to one or more embodiments, the entity engine 401 provides a specific configuring and tooling robotic process automation method for development and deployment platforms of the computing system or environment. This specific configuring and tooling robotic process automation method involves a multi-step manipulation (e.g., create/define/update/read/delete/query) of entities and data that these entities point to in connection with operating the development and deployment platforms. To provide the persistent data storage service, the entity engine 401 can implement servicing operations 410 (e.g., development/deployment data services), integration operations 415 (e.g., entity deployment integration), activity operations 420 (e.g., integration schema and activities), import/export operations 425 (e.g., entity importation/exportation), representation operations 430 (e.g., imported/exported entity representation), and display operations 435 (e.g., entity display), with respect to the entities and the data therein.

Regarding the implementation of the servicing operations 410 (e.g., development/deployment data services), the entity engine 401 generates, centralizes, accesses, and uses data seamlessly in the development and/or deployment platforms to enable developers to build products and features (e.g., RPA, artificial intelligence, long running workflows, applications, analytics, etc.) around the data that otherwise are not available with conventional external services. More particularly, the servicing operations 410 include enabling users to define/modify/extend entities and store records/data for those entities; to seamlessly access the entities, records and documents from other products in the development and/or deployment platforms; support rich metadata like relationships, rules, and attributes on the entities, store documents associated with the records/entities; easily and securely configure permissions; and generate and provide 'out of box' entities.

For example, if users want to build a process, a ML model, or an application and has a need to store any respectively generated data, the users first locate an external database or system of record (e.g., Salesforce, SAP, CRM, Excel, etc.) and second integrate that record with their process/ML model/application to persist the data. The entity engine 401 provides a solution for organizations/creators/business users who need to create, store, and/or access data (e.g., business data) as part of their products and feature usage, such that the persistent data storage service that is available 'out of box' in the development and/or deployment platforms allows users to seamlessly model, store, and access such data for all their use cases.

The technical effects and benefits of the entity engine 401 include seamless integration (e.g., minimizing an effort to use data service within the development and/or deployment platforms). For instance, entities defined in persistent data storage service can be available as rich objects/classes (as described herein) in the development and/or deployment platforms. The technical effects and benefits of the entity engine 401 also include, but are not limited to, providing an ability to handle roles and permissions for processes/ML models/applications and data can be handled together and providing pre-built reports/analytics/process to track case/incident volumes(e.g., where no system of records exist, uses do not have to create a new one or find a place to store their data; while products can depend on existing entities and provide rich 'out of box' experiences).

Regarding the implementation of the integration operations 415, the entity engine 401 enables users to use entities in the development and/or deployment platforms, thereby reducing the number of variables and arguments that need to be used in a project and also giving more structure to the data used throughout workflows. Moreover, the entities of the entity engine 401 can establish a common "contract" between two or more workflows, by defining the structure of data that will be transacted between them or via queues.

In an example use case, as workflows are modular and software development best practices suggest that workflows be broken down into small, individual pieces of functionality that can work independently, there is a need to pass data to and from those workflows. Some workflows have a lengthier list of arguments, as they operate with complex data structures that are not easy to implement in the development and/or deployment platforms. As a result, RPA developers use multiple arguments to pass all needed data which drives a number of problems. That is, conventional platforms do not provide an ability to create and use data structures that enable chaining processes and definitions of a contract between "caller" and "callee" workflows. Particularly, an amount of required in/out arguments and variables that needs to be passed between workflows and processes makes it hard to build and maintain processes, using and importing custom complex data types within conventional platforms is not an easy task and with many limitations; reusing complex types across workflows is not supported (which means that even if the same types are needed across multiple projects, the complex types need to be added to every project); searching for existing types and namespaces is a hefty procedure; automatic import of complex types inside workflows is not supported by conventional platforms; there is a big complexity of passing data in and around workflows and that applies to activities that deal with forms, documents, taxonomies, and ontologies; and some needed existing structures are not serializable and isolated workflows only accept serializable arguments.

In view of the shortcomings and concerns of the conventional platforms, the integration operations 415 of the entity engine 401 provide a high-level approach that includes the entity engine 401 being a dedicated entity web service. That is, the entity engine 401 can be implemented as a dedicated entity web service where developers can define a structure of each entity and link several entity types together. For example, the entity engine 401, when implemented as the dedicated entity web service, can require that an entire management of the entities is accounted for in an entity definition (as described herein). The entity engine 401 can also include a storage repository 440 for entities and a means to list (e.g., the list 345 of FIG. 3) all instances (e.g., of the entity engine 401) that the developers have access to and the entities (e.g., the entities 340 of FIG. 3) defined within them. Note that the entity engine 401 can be duplicated, replicated, and/or executed as one or more instances across one or more platforms and/or devices, thereby providing consistent 'entity' operations and activities from those one or more platforms and/or devices. The entity engine 401 can also include means to import those defined entities as custom datatypes in any platform; a means of storing and displaying the current set of imported entities (e.g., the storage repository 440), with tools to update and use them; and a set of activities that can handle the retrieval and storage of instances of each custom entity to/from the entity engine 401 (e.g., as a dedicated entity web service).

Regarding the implementation of the activity operations 420, the entity engine 401 enables users/developers to work with rich objects/classes (i.e., entities) in any platform, to create, update, import, query, and/or delete entity data of the entities. Note that any of the examples of entities as rich objects/classes (e.g., ".NET" classes, Java classes, and JS classes) can be used to create, update, import, query, and/or delete entity data. Turning now to FIG. 5, a diagram of a user interface according to one or more embodiments is shown. That is, FIG. 5 illustrates one or more panels 510 and 520 of the user interface. The panel 510 illustrates an activity where a user can create an entity record by selecting an entity type and providing entity data in the presented fields. The panel 520 illustrates activities where a user can query one or more entity records by selecting/inputting an entity type and providing query information in the presented fields.

For example, with respect to the scope of the set of activities, the entity engine 401 can create, update, or delete a single record; read a single record; query/read a set of records from a single entity based on query filters; create, update, or delete a set of records of a single entity type; fetch related entities as a set of associated records, as well as support many-to-many and/or parent-child relationships; and support uploading/downloading files associated with/ within records. Further, the entity engine 401 can show related entities, a set of associated records, the many-to-many relationships, and the parent-child relationship within a user interface.

In accordance with one or more embodiments, the entity engine 401 provides access control for the entities therein. For instance, activities of the entity engine 401 can initially work against any currently connected tenant/RPA/user using security tokens generated from activities application programable interface (or provided by the designer 102, the executor 106, or the conductor 104 of FIG. 1A) to ensure that the access to the entities is limited to a tenant/RPA/ user's context. Further, the entity engine 401, if on a same device as the currently connected tenant/RPA/user, can eliminate a need to separately provide a uniform resource locator (URL) of the entity engine 401 activity or security tokens. Alternatively, if the entity engine 401 is not on a same device as the currently connected tenant/RPA/user, the entity engine 401 can provide (via auto-discovery operations) the URL of the entity engine 401 activity or security tokens to ensure integrated authentication and authorization (otherwise the URL can be eliminated). Note that if there is no entity engine 401 endpoint available for the currently connected instance, the entity engine 401 can issue an error (depending on the scenario).

Regarding the implementation of the import/export operations 425, the entity engine 401 enable users (via an entity import wizard) to use entities in any platform or on any device, thereby reducing the number of variables and arguments that need to be used in a project and also giving more structure to the data used throughout workflows. The entity import wizard can automatically provide the entities for use in any platform. For instance, because RPA developers require a means of transitioning entities and data to and from the entity engine 401 and a respective local environment (e.g., local development platform), the entity engine 401 provides the entity import wizard that defines "importing" entities and data of any platform. Note that the entities imported through the entity import wizard can be usable in automations for variables, arguments, etc., as well as reference types for the set of activities described herein.

In accordance with one or more embodiments, the entity engine 401 can set one or more pre-requirements from the entity import wizard, as there are various dependencies for platform activities that are supported by entity import wizard. In accordance with one or more embodiments, any imported entity can have all properties/fields/columns available with their respective data types, all entities that are imported via the new entity import wizard can inherit from a single base for a receiving platform, a name (e.g., Entity-Base) can be suggested for a base type, and relationships can be strongly typed.

For example, once entities have been created/defined (by the designer 102, the executor 106, or the conductor 104 of FIG. 1A), the user can invoke the entity import wizard and connect to an entity store (described herein). Once the entity import wizard loads identifiers for the entities, the entity import wizard can present a direct link to a particular entity itself. The user can select from the entity import wizard all entities that should be imported (e.g., all can be selected by default). Note that, when selecting to import a certain entity, all dependencies thereof are imported as well (e.g., entities to which an entity has a relationship, dependencies have a relationship, etc.). Generally, a dependency is an entity to which another entity has a relationship (i.e., an entity B is a dependency of an entity A if the entity A has a field of a type B). The dependencies can remain unselected in the entity list. In some cases, an entity can be imported if it meets a criterion, such as if it was explicitly selected by the user making the import and/or if it is a direct or indirect dependency of a selected entity.

Regarding the implementation of the representation operations 430, the entity engine 401 can render entity representations within a user interface or a configuration panel thereof. In this regard, the entity engine 401 can list entities (via entity representations) in a dedicated panel (e.g., a configuration panel) of the user interface for quick and easy handling, usage and management. For instance, the entity engine 401 can connect with a user interface of a designer (e.g., the designer 102 of FIG. 1A) and place in a designer panel of the user interface the entity representations for use by the designer 102. By way of example if an RPA developer has an old version of an entity, the RPA developer can view representations of the all entities (identified by a list or provided through an entity store) and synchronize the old version to a newer version available.

Each entity representation can include information, such as origin, version, subset, and namespace name. The origin is an entity store of the entity engine 401 from where the set of entities were imported (e.g., stored as metadata). The version is an entity store version offered by the entity engine 401 at the time the set of entities were imported (e.g., stored as metadata). The subset, given the entire set of entities that was present in the imported version, is an exact subset of entities that can operate independently (e.g., without referencing any entity that is not in the imported subset). The namespace name is a user chosen name for that particular set of entities.

Regarding the implementation of the display operations 435, the entity engine 401 provides an online entity display or interface (e.g., a web-based user interface) where a list of entities from the entity engine 401 is discoverable and can be manipulated. In the context of this integration, RPA developers need a way to discover entities that are available to them from the instances of the entity engine 401 (e.g., that they have access to given the username that they use to authenticate).

In turn, the entity engine 401 provides a configuration panel (e.g., a dedicated resource panel) or an entity store (as described herein) that shows/illustrates the entity engine 401. All entities from this entity engine 401 can be listed and manipulated (e.g., imported, dropped in the designer panel, etc.). Note that any currently connected tenant/RPA/user that does not have an entity engine 401 enabled, will not show/ provide the entities associated therewith. Turning now to FIG. 6, a diagram of a user interface according to one or more embodiments is shown. That is, FIG. 6 illustrates a panel 601 (e.g., a configuration panel as described herein). A header 611 of the panel 601 indicates that 'Entities' are being shown. Each entity is shown in a first column 620 with corresponding one or more fields associated therewith. For example, the entities of the first column 620 include CustomerInvoice, Customers, Invoice, Order, Portfolio, Product, and StockTracker. Further, the fields associated with the CustomerInvoice include CreatedBy, CreateTime, Id, UpdatedBy, and UpdateTime. Note that while some entities are shown with fields and others entities are not, the example display of the panel 601 is not intended to be limiting. Corresponding to the entities in the first column 620 are properties of a second column 630. For instance, the second column 630 identifies properties, such as a number of records for each entity (e.g., the Invoice entity has 3 records) and a field type (e.g., the CreatedBy field is a string type field, while the DigitalAccess is a Boolean type field0). In accordance with one or more embodiment, the panel 601 can also provide/display contextual actions (e.g., import action that invokes the entity import wizard with all comprised entities selected) and go to definition actions (e.g., opens the entity engine 401 at that particular entity store).

In view of the embodiments herein, the technical effects and benefits of the entity engine and entities include providing the persistent data storage service where users can store business related data in the development and deployment platforms for anytime, on-demand access. The technical effects and benefits of the entity engine and entities further include an ability to create/define an entity/data model and import that entity/data model into any platform, to show or display these imported entity/data models, and to store/retrieve data associated with the entity/data model via a set of activities. The technical effects and benefits of the entity engine and entities further includes authentication and authorization operations (using token-based identities) to provide the entity engine secure access capabilities.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. A computer readable medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire Examples of computer-readable media include electrical signals (transmitted over wired or wireless connections) and computer-readable storage media. Examples of computer-readable storage media include, but are not limited to, a register, cache memory, semiconductor memory devices, magnetic media such as internal hard disks and removable disks, magneto-optical media, optical media such as compact disks (CD) and digital versatile disks (DVDs), a random access memory (RAM), a read-only memory (ROM), an erasable programmable read-only memory (EPROM or Flash memory), a static random access memory (SRAM), and a memory stick. A processor in association with software may be used to implement a radio frequency transceiver for use in a WTRU, UE, terminal, base station, RNC, or any host computer.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A cloud environment comprising:
one or more memories configured to store processor executable instructions for an entity engine comprising an entity import wizard; and
one or more processors coupled to the one or more memories,
wherein the one or more processors are configured to execute the entity engine to cause the cloud environment to:
model and store, by the entity engine, one or more entities configured to hold or classify data; and
provide, by the entity import wizard of the entity engine, the one or more entities to an external system to reduce a number of variables and arguments for a project on the external system and to structure the data used by one or more workflows of the project, wherein the entity import wizard provides the one or more entities by exporting a first entity of the one or more entities to the external system in response to receiving a selection within a list.

2. The cloud environment of claim 1, wherein the entity engine stores the list identifying each of the one or more entities and the entity import wizard presents the list to the external systems for the selection.

3. The cloud environment of claim 1, wherein the entity import wizard is configured to transition the one or more entities and the data to and from the entity engine.

4. The cloud environment of claim 1, wherein the entity engine sets one or more pre-requirements from the entity import wizard.

5. The cloud environment of claim 1, wherein the entity import wizard is invoked to connect an entity store to the external system.

6. The cloud environment of claim 1, wherein the entity import wizard loads identifiers for the one or more entities and presents a direct link to each of the one or more entities.

7. The cloud environment of claim 1, wherein the one or more entities are further configured to hold or classify the data with respect to one or more properties, one or more fields, or one or more columns.

8. The cloud environment of claim 1, wherein the entity engine is integrated into one or more platforms or the external system to provide structure and enable use of the one or more entities with respect to workflows therein.

9. The cloud environment of claim 1, wherein the one or more entities are further configured to define variables associated with the data.

10. The cloud environment of claim 1, wherein the one or more processors are configured to execute the entity engine to cause the cloud environment to authenticate and authorize access to the one or more entities.

11. The cloud environment of claim 1, wherein each of the one or more entities comprises a configurable structure of each entity that can define an entity type.

12. The cloud environment of claim 1, wherein the data comprises forms, documents, invoices, or records.

13. The cloud environment of claim 1, wherein the list identifies one or more instances of the entity engine accessible with respect to the one or more entities.

14. The cloud environment of claim 1, wherein the first entity is exported from the entity engine and imported into a development platform or a deployment platform.

15. The cloud environment of claim 1, wherein the one or more entities comprise rich objects.

16. A entity engine platform implemented as processor executable instructions stored on one or more memories and executed by one or more processors, wherein the entity engine platform is configured to model and store one or more entities configured to hold or classify data, wherein the entity engine platform comprises an entity import wizard configured to:

provide the one or more entities to an external system to reduce a number of variables and arguments for a project on the external system and to structure the data used by one or more workflows of the project, wherein the entity import wizard provides the one or more entities by exporting a first entity of the one or more entities to the external system in response to receiving a selection within a list.

17. The entity engine platform of claim 16, wherein the entity engine stores the list identifying each of the one or more entities and the entity import wizard presents the list to the external systems for the selection.

18. The entity engine platform of claim 16, wherein the entity import wizard is configured to transition the one or more entities and the data to and from the entity engine.

19. The entity engine platform of claim 16, wherein the entity engine sets one or more pre-requirements from the entity import wizard.

20. The entity engine platform of claim 16, wherein the entity import wizard is invoked to connect an entity store to the external system.

* * * * *